United States Patent
Lee et al.

(10) Patent No.: US 9,972,091 B2
(45) Date of Patent: May 15, 2018

(54) SYSTEM AND METHOD FOR DETECTING OBJECT FROM DEPTH IMAGE

(71) Applicant: Electronics and Telecommunications Research Institute, Daejeon (KR)

(72) Inventors: Su Woong Lee, Sejong-si (KR); Jun Suk Lee, Daejeon (KR); Hyung Keun Jee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 123 days.

(21) Appl. No.: 15/007,942

(22) Filed: Jan. 27, 2016

(65) Prior Publication Data

US 2017/0193665 A1 Jul. 6, 2017

(30) Foreign Application Priority Data

Jan. 4, 2016 (KR) ........................ 10-2016-0000644

(51) Int. Cl.
*G06T 7/00* (2017.01)
*G06K 9/00* (2006.01)

(52) U.S. Cl.
CPC ........ *G06T 7/0079* (2013.01); *G06K 9/00335* (2013.01); *G06T 2207/10028* (2013.01); *G06T 2207/20144* (2013.01)

(58) Field of Classification Search
CPC ......... G06T 7/0079; G06T 2207/10028; G06T 2207/20144; G06K 9/00335
See application file for complete search history.

(56) References Cited

U.S. PATENT DOCUMENTS

| 6,661,918 B1 | 12/2003 | Gordon et al. |
| 8,781,217 B2 * | 7/2014 | Gurman ............ G06K 9/00201 345/419 |

(Continued)

FOREIGN PATENT DOCUMENTS

| KR | 10-2013-0043394 | 4/2013 |
| KR | 10-2013-0120202 | 11/2013 |

OTHER PUBLICATIONS

Lu Xia et al., "Human Detection Using Depth Information by Kinect", CVPR workshop, 2011, pp. 15-22.

*Primary Examiner* — Sean Conner
*Assistant Examiner* — Pinalben Patel
(74) *Attorney, Agent, or Firm* — Kile Park Reed & Houtteman PLLC

(57) ABSTRACT

Provided is a system for detecting an object from a depth image. The system includes a communication module, a memory, and a processor. By executing the object detection program, the processor extracts a first object area and a second object area from the depth image, based on a predetermined floor plane and an outer plane which is set with respect to the predetermined floor plane. The processor extracts a target area including pixels of the second object area which are spaced apart from the first object area by a predetermined interval. The processor samples a pixel, which is not included in the target area, to extract a floor area from the second object area, calculates a boundary value of an object and a floor, based on the floor area and the target area, and extracts a foreground pixel from the target area, based on the calculated boundary value.

13 Claims, 12 Drawing Sheets

(56) References Cited

U.S. PATENT DOCUMENTS

| | | | |
|---|---|---|---|
| 9,317,741 B2* | 4/2016 | Guigues | G06K 9/00342 |
| 2004/0057599 A1* | 3/2004 | Okada | G06T 7/248 |
| | | | 382/103 |
| 2010/0302395 A1* | 12/2010 | Mathe | G06K 9/00342 |
| | | | 348/222.1 |
| 2011/0150321 A1 | 6/2011 | Cheong et al. | |
| 2011/0205340 A1* | 8/2011 | Garcia | G01S 7/4972 |
| | | | 348/46 |
| 2013/0101169 A1 | 4/2013 | Park et al. | |
| 2013/0101170 A1* | 4/2013 | Park | G06T 7/0079 |
| | | | 382/103 |
| 2013/0266223 A1* | 10/2013 | Zhang | G06T 7/0081 |
| | | | 382/173 |
| 2013/0286162 A1 | 10/2013 | Lee et al. | |
| 2014/0111507 A1 | 4/2014 | Kim et al. | |
| 2015/0325004 A1* | 11/2015 | Utsunomiya | A61B 5/742 |
| | | | 382/103 |

\* cited by examiner

SYSTEM AND METHOD FOR DETECTING OBJECT FROM DEPTH IMAGE

CROSS-REFERENCE TO RELATED APPLICATIONS

This application claims priority under 35 U.S.C. § 119 to Korean Patent Application No. 10-2016-0000644, filed on Jan. 4, 2016, the disclosure of which is incorporated herein by reference in its entirety.

TECHNICAL FIELD

The present invention relates to a system and a method for detecting an object from a depth image.

BACKGROUND

In the image processing field, image segmentation technology is an important issue as well as a sticking point which is not easily solved. The image segmentation technology has been researched for decades. However, real time, various illuminations, various background environments, and prior knowledge of a user are needed, and moreover, there is no one integrated solution for solving various issues. At present, there are products which operate under only a limited condition.

However, since distributive depth cameras are distributed, it is possible to extract an object such as a person and a gesture in real time in a normal home environment. As a representative example, there are Kinect sensors developed by Microsoft company.

The Kinect sensors are each configured by combining an RGB camera sensor with an infrared camera sensor and recognize a gesture and a motion of each of users. Only an area of a person can be very easily extracted from an image by using a learner extraction method provided by a Kinect sensor. Since low-price hardware of the Kinect sensors is distributed and a disclosed library is supplied, it is possible to develop a number of applicable gesture recognition technologies.

However, the Kinect sensors have a problem where satisfactory performance is not obtained in an outer portion in extracting an area of a person. This is because noise of a depth sensor, a person, and a background actually contact each other, and thus, a depth value is obtained as a similar value. Due to such a problem, it is not easy to separate a person and a background area.

Particularly, a foot region of a person contacts a floor in a background, and due to noise of a sensor and characteristic of a non-uniform floor, it is difficult to accurately detect the foot region of the person by using a related art detection method.

In this context, Korean Patent Publication No. 2013-0043394 "image processing method and apparatus for detecting target, and method and apparatus for user interface" discloses details where a target is extracted by using only depth information of an image obtained from a stereo camera.

SUMMARY

Accordingly, the present invention provides an object detection system and method, which detect an object from a depth image of the object and particularly detect a portion of the object contacting a floor.

The objects of the present invention are not limited to the aforesaid, but other objects not described herein will be clearly understood by those skilled in the art from descriptions below.

In one general aspect, a system for detecting an object from a depth image includes: a communication module; a memory configured to store an object detection program; and a processor configured to execute the object detection program, wherein by executing the object detection program, the processor extracts a first object area and a second object area from the depth image, based on a predetermined floor plane and an outer plane which is set with respect to the predetermined floor plane, the processor extracts a target area including pixels of the second object area which are spaced apart from the first object area by a predetermined interval, the processor samples a pixel, which is not included in the target area, to extract a floor area from the second object area, calculates a boundary value of an object and a floor, based on the floor area and the target area, and extracts a foreground pixel from the target area, based on the calculated boundary value, and the second object area includes the object and the floor and is disposed under the first object area.

In another general aspect, an object detection method, performed by an object detection system, includes: receiving a depth image from a depth camera; extracting a first object area from the depth image, based on a predetermined floor plane and an outer plane which is set with respect to the predetermined floor plane; extracting a second object area from the depth image, based on the predetermined floor plane and the outer plane; extracting a target area including pixels of the second object area which are spaced apart from the first object area by a predetermined interval; sampling a pixel, which is not included in the target area, to extract a floor area from the second object area; calculating a boundary value of an object and a floor, based on the floor area and the target area; and extracting a foreground pixel from the target area, based on the calculated boundary value, wherein the second object area includes the object and the floor and is disposed under the first object area.

Other features and aspects will be apparent from the following detailed description, the drawings, and the claims.

DETAILED DESCRIPTION OF EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity.

In this disclosure below, when it is described that one comprises (or includes or has) some elements, it should be understood that it may comprise (or include or has) only those elements, or it may comprise (or include or have) other elements as well as those elements if there is no specific limitation.

Figure 1:
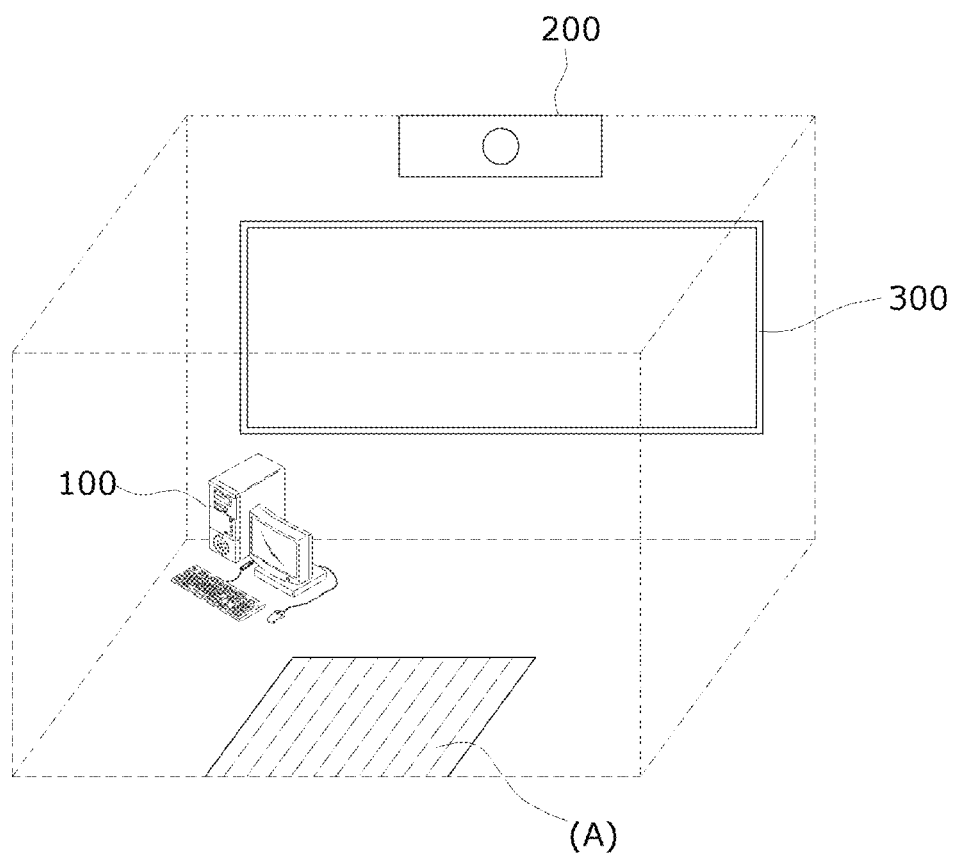
FIG. 1 is a diagram for describing an example of an implementation environment to which an object detection system and method according to an embodiment of the present invention are applied.

FIG. 1 is a diagram for describing an example of an implementation environment to which an object detection system 100 and method according to an embodiment of the present invention are applied.

The implementation environment to which the object detection system 100 and method according to an embodiment of the present invention are applied, as illustrated in FIG. 1, may include an object detection system 100, a camera 200, and a display unit 300.

First, the camera 200 may be a camera that captures an image of a user and measures visible light and a depth. In this case, the camera 200 may be installed to be separated into a camera, which measures visible light, and a camera that measures a depth. Hereinafter, the object detection system 100 according to an embodiment of the present invention will be described on the assumption that the camera 200 is a depth camera 200.

The display unit 300 may be a light-emitting device such as a screen-projector pair, a liquid crystal display (LCD), or the like. The display unit 300 may receive and display an object image detected by the object detection system 100.

The object detection system 100 may receive an image captured by the camera 200 and may separate a background from the received image to detect an object of a user. Also, the object detection system 100 may transmit a detected result to the display unit 300, thereby enabling a user to check a motion of the user. Therefore, the user may experience an interactive service while looking at the display unit 300.

Moreover, an object extraction space A may be set for more accurately detecting an object. That is, objects having various shapes may be located in a space where a user is located. Therefore, if a user is located in all spaces, it is difficult to accurately detect an object. Accordingly, the object detection system 100 according to an embodiment of the present invention may define a virtual boundary plane and may determine, as a person (i.e., an object), a thing located in a polyhedron which includes a corresponding plane.

Hereinafter, the object detection system 100 according to an embodiment of the present invention will be described with reference to FIGS. 2 to 6.

Figure 2:
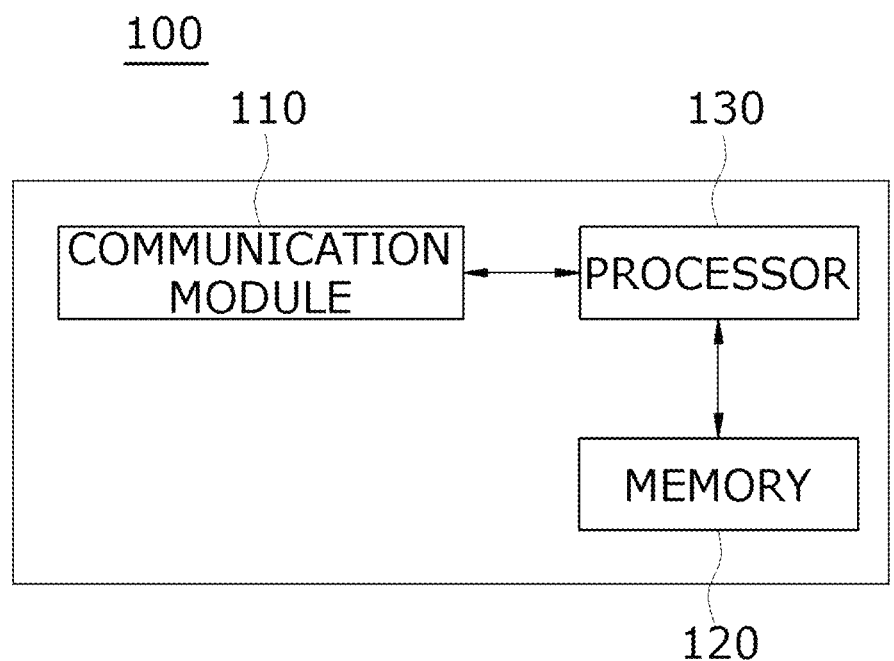
FIG. 2 is a block diagram of an object detection system according to an embodiment of the present invention.

FIG. 2 is a block diagram of the object detection system 100 according to an embodiment of the present invention.

Figure 3:
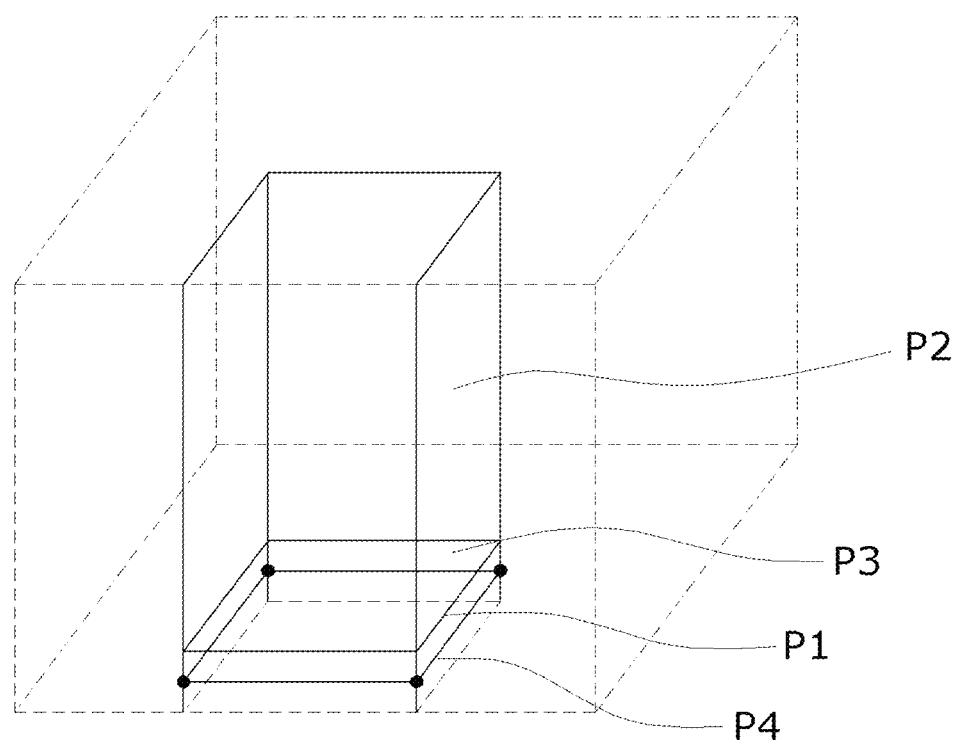
FIG. 3 is a reference diagram of each of a floor plane, an outer plane, an upper floor plane, and a lower floor plane.
Figure 4:
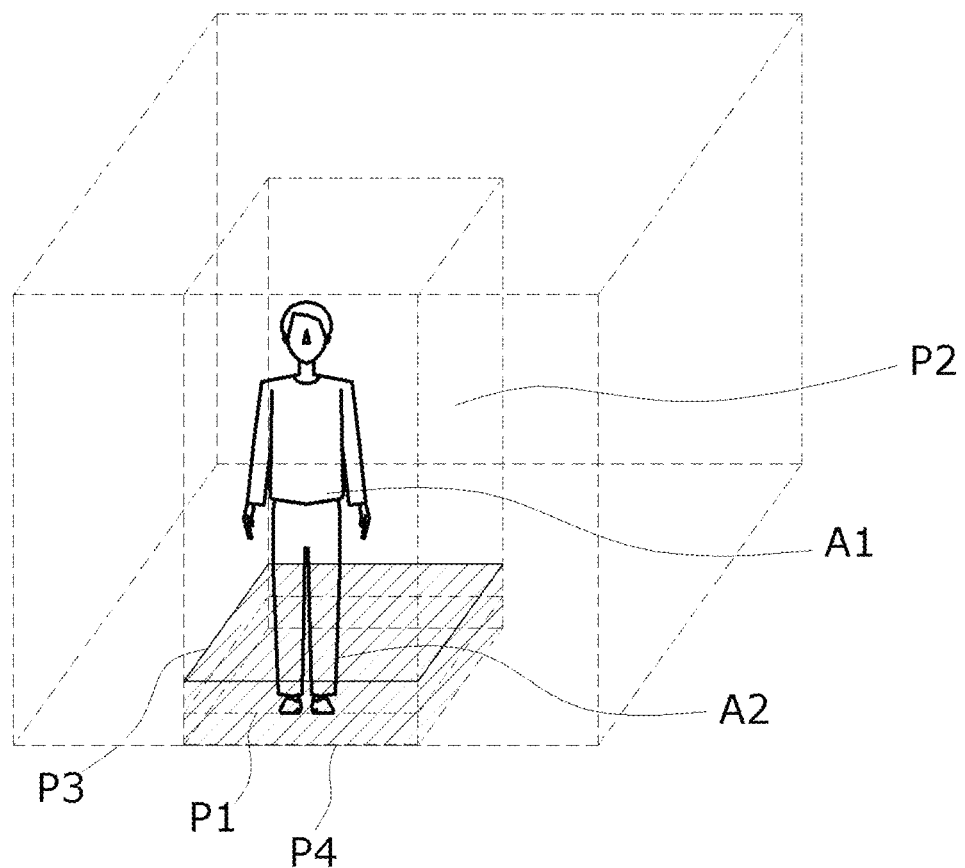
FIGS. 4 and 5 are reference diagrams of a first object area, a second object area, a target area, and a block area.
Figure 5:
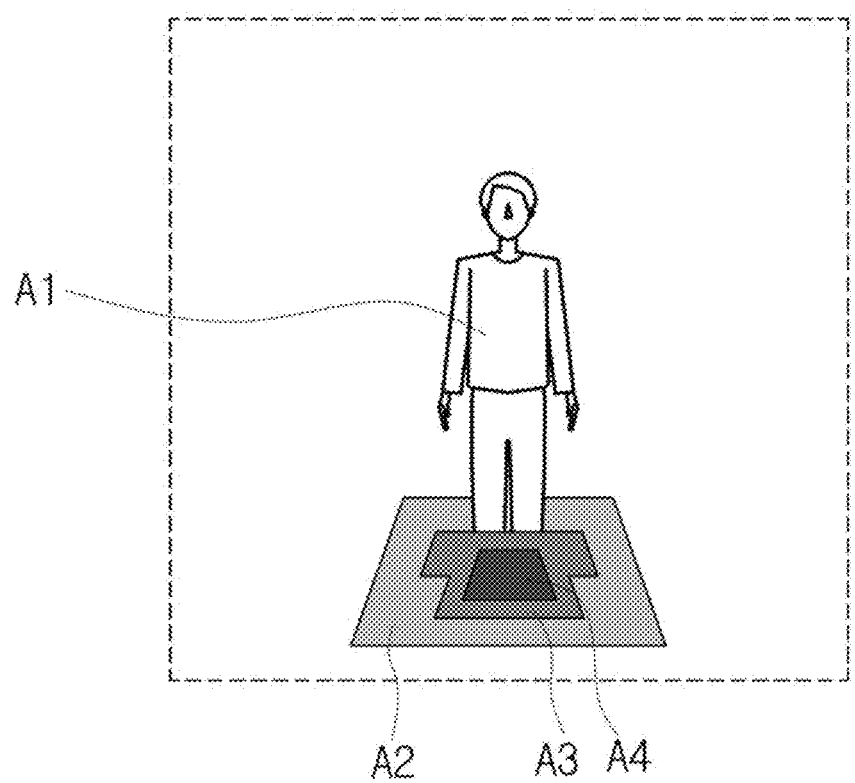
Figure 6:
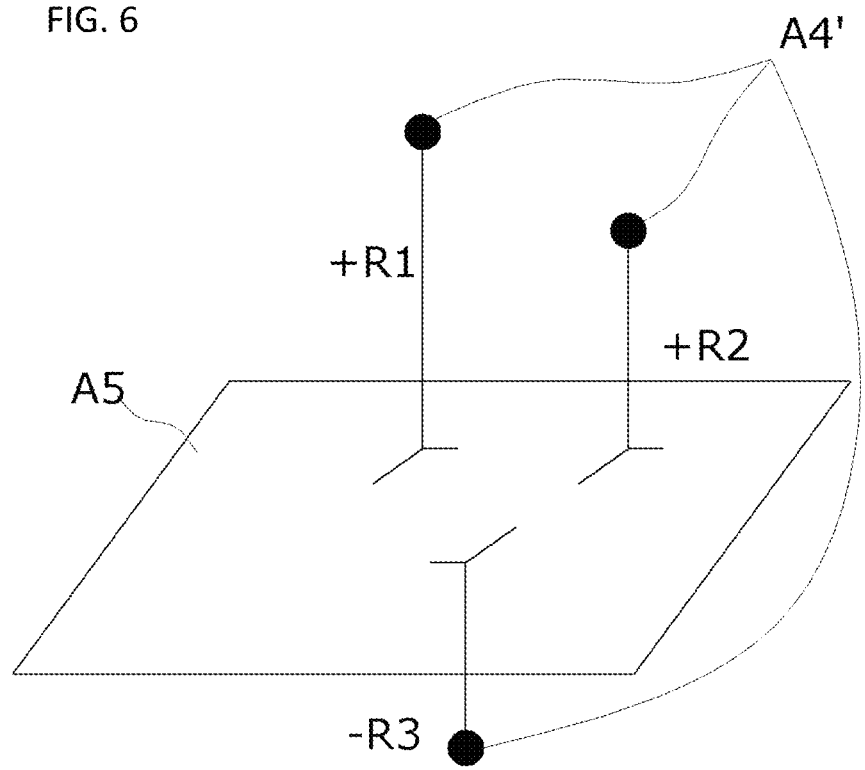
FIG. 6 is a reference diagram for describing an operation of extracting a foreground pixel according to an embodiment of the present invention.

FIG. 3 is a reference diagram of each of a floor plane, an outer plane, an upper floor plane, and a lower floor plane. FIGS. 4 and 5 are reference diagrams of a first object area, a second object area, a target area, and a block area. FIG. 6 is a reference diagram for describing an operation of extracting a foreground pixel according to an embodiment of the present invention.

The object detection system 100 according to an embodiment of the present invention may include a communication module 110, a memory 120, and a processor 130.

For reference, the elements according to an embodiment of the present invention illustrated in FIG. 2 may each be implemented in the form of software or in the form of hardware such as a field programmable gate array (FPGA) or an application specific integrated circuit (ASIC) and may perform certain functions.

However, the elements are not limited to software or hardware in meaning. In other embodiments, each of the elements may be configured to be stored in a storage medium capable of being addressed, or may be configured to execute one or more processors.

Therefore, for example, the elements may include elements such as software elements, object-oriented software elements, class elements, and task elements, processes, functions, attributes, procedures, subroutines, segments of a program code, drivers, firmware, microcode, circuits, data, databases, data structures, tables, arrays, and variables.

Elements and a function provided in corresponding elements may be combined into fewer elements or may be further divided into additional elements.

Each of the elements of the personal content providing system 1 according to an embodiment of the present invention may include a communication module (not shown), a memory (not shown), and a processor (not shown).

The communication module 110 may receive a depth image captured by the depth camera 200. In this case, the communication module 110 may receive the depth image in units of one frame from the depth camera 200. The depth image may have a depth value for each of pixels, and thus, one three-dimensional (3D) point may be shown for each pixel.

In this case, the communication module 110 may include a wired communication module and a wireless communication module. The wired communication module may be implemented with a power line communication device, a telephone line communication device, a cable home (MoCA), Ethernet, IEEE1294, an integration wired home network, an RS-485 control device, and/or the like. Also, the wireless communication module may be implemented with WLAN, Bluetooth, HDR WPAN, UWB, Zigbee, impulse radio, 60 GHz WPAN, binary-CDMA, wireless USB technology, wireless HDMI technology, and/or the like.

The memory 120 may store programs for respectively operating the elements. Here, the memory 120 may be a generic name for a volatile memory and a nonvolatile memory that continuously maintains stored information even when power is supplied thereto.

For example, examples of the memory 120 may include NAND flash memory such as a compact flash (CF) card, a secure digital (SD) card, a memory stick, a solid state driver (SSD), and a micro SD card, a magnetic computer memory device such as a hard disk drive (HDD), and an optical disk drive such a CD-ROM and a DVD-ROM.

Moreover, the programs stored in the memory 120 may each be implemented in the form of software or in the form of hardware such as an FPGA or an ASIC and may perform certain functions.

The processor 130 may execute an object detection program. By executing the object detection program, the processor 130 may extract a first object area and a second object area from a depth image received by the communication module 110, based on a predetermined floor plane and an outer plane which is set with respect to the floor plane.

In this case, the first object area may correspond to an area disposed above the second object area. On the other hand, the second object area may be an area that includes an object and a floor, and may be disposed under the first object area.

In this context, referring to FIG. 3, the object detection system 100 according to an embodiment of the present invention may previously set an object extraction space as described above. Four points contacting a floor plane may be detected in the object extraction space, and a floor plane P1 may be set. In this case, the floor plane P1 may be derived based on a floor plane equation.

Moreover, a floor plane passing through two successive points among four points included in a floor plane may be detected from among planes vertical to the floor plane P1 and may be set as an outer plane P2. Similarly to the floor plane P1, the outer plane P2 may be derived based on an outer plane equation.

Due to noise of a sensor and non-uniformity of an actual floor, all points of a floor may not accurately pass through the floor plane P1. Therefore, an upper floor plane P3 and a lower floor plane P4 may be set in order for areas, corresponding to a portion of the floor and a portion of an object, to be added thereinto.

That is, the floor plane P1 may include the upper floor plane P3 and the lower floor plane P4 which are set above and under the floor plane P1 in parallel to be spaced apart from each other by a predetermined interval. Therefore, the processor 130 may extract a first object area A1, based on the upper floor plane P3 and the outer plane P2.

Moreover, the processor 130 may extract a second object area A2, based on the outer plane P2, the upper floor plane P3, and the lower floor plane P4.

Referring to FIGS. 4 and 5 for describing the first object area A1 and the second object area A2, the processor 130 according to an embodiment of the present invention may extract the first object area A1, based on the outer plane P2 and the upper floor plane P3. The first object area A1 may correspond to an area which is formed by projecting points on 3D coordinates, disposed above the upper floor plane P3, onto points on two-dimensional (2D) coordinates.

For example, in a case where an object is a person, when the person is located in a space that includes the outer plane P2 and the upper floor plane P3, a space above the upper floor plane P3 may not contact another object. Therefore, an area above the upper floor plane P3 may be determined as a person area. Since the upper floor plane P3 is disposed at a position far higher than that of the floor plane P1, the area may include all parts of a human body except a floor and feet.

Subsequently, the processor 130 according to an embodiment of the present invention may extract the second object area A2, based on the outer plane P2, the upper floor plane P3, and the lower floor plane P4. The second object area A2 may correspond to an area which is formed by projecting points on 3D coordinates, disposed between the upper floor plane P3 and the lower floor plane P4, onto points on the 2D coordinates.

For example, in a case where an object is a person, the second object area A2 may be derived as an area including points included in a portion disposed under the upper floor area P3. Points included in the derived area may correspond to an area where a body of the person and a background which have a similar depth are all extracted, and thus, only a part corresponding to a human body except the background may be extracted from the area.

Referring again to FIG. 2, the processor 130 may extract a target area including pixels of the second object area which are spaced apart from the first object area by a predetermined interval. Also, the processor 130 may sample pixels which are not included in the target area, thereby extracting a floor area from the second object area.

As described above, the processor 130 may calculate a boundary value of the object and the floor, based on the extracted floor area and target area and may extract a foreground pixel from the target area, based on the calculated boundary value.

In more detail, the processor 130 according to an embodiment of the present invention may segment the target area into a plurality of block areas. Also, based on one of the segmented block areas, the processor 130 may sample a pixel which is included in the second object area but is not included in the target area, thereby extracting a floor area from the second object area.

When the floor area is extracted, the processor 130 may calculate distances between the floor area and pixels included in the block area. Also, the processor 130 may calculate a boundary value between the object and the floor, based on a distribution of the calculated distances.

Therefore, the processor 130 may extract a foreground pixel from the block area, based on the calculated boundary value.

Referring to FIGS. 4 to 6 for describing an operation of extracting a foreground pixel, an area which does not correspond to a body of a person may be first removed from the second object area A2 for extracting only an area of the person from the second object area A2. Since a person has a certain shape, the second object area A2 may be narrowed by detecting pixels adjacent to the first object area A1 from a pixel coordinate system. That is, points which are spaced apart from the first object area A1 by a distance less than a specific value may be extracted from among points included in the second object area A2. The extracted area may be set as a target area A3.

When the target area A3 is extracted, the processor 130 may segment the target area A3 into a plurality of block areas A4. Also, the processor 130 may calculate a local plane which divides a floor area and a foot area for each of the block areas A4, and may separate a human body and a background, based on the calculated local plane. Such an operation may be repeatedly performed for each of the block areas A4.

In detail, after the processor 130 segments the target area A3 into the plurality of block areas A4, the processor 130 may sample points, which is included in the second object area A2 but is not included in the target area A3, at certain intervals with respect to each of the block areas A4. Also, the processor 130 may set, as a floor area, a plane having a minimum error from the sampled points.

In this case, the extracted floor area may be expressed in a plane equation form. That is, points of the extracted plane may each be expressed in a 3D vector form, and thus may be derived as an equation-form plane for minimizing a squared error.

Subsequently, the processor 130 may calculate distances between points included in the block areas A4 and the plane extracted from the floor area. Also, the processor 130 may derive a minimum boundary value that separates a person and a background, based on a distribution value of the distances between the points included in the block areas A4 and the plane. The processor 130 may determine a foreground pixel in each of the block areas A4, based on the derived boundary value.

In this context, referring to FIG. 6, the processor 130 may remove pixels, having a direction (−) different from that of the first object area A1, from among pixels included in each of the block areas A4 and may maintain pixels having the same direction (+) as that of the first object area A1. Then, the processor 130 may calculate distances between the pixels, having the same direction (+) as that of the first object area A1, and the plane derived from the floor area. The processor 130 may select points where the calculated distances have a certain value or more, thereby finally extracting a foreground pixel.

The first object area A1, the second object area A2, the target area A3, and the block areas A4 may be marked on 2D coordinates, but points included in the areas may be marked in a vector form on 3D coordinates. That is, each of the points may have an x coordinate value and a y coordinate of the 2D coordinates and may also have a depth value. Therefore, the points of the areas may each be marked in the form of (x, y, depth).

As described above, if a foreground pixel is extracted, the processor 130 accurately separates a portion where a floor area contacts an object. Also, by displaying the portion along with the first object area A which is certainly determined as an object, a user checks an object which is more clearly extracted.

Hereinafter, an object detection method performed by the object detection system 100 according to an embodiment of the present invention will be described with reference to FIGS. 7 and 8.

Figure 7:
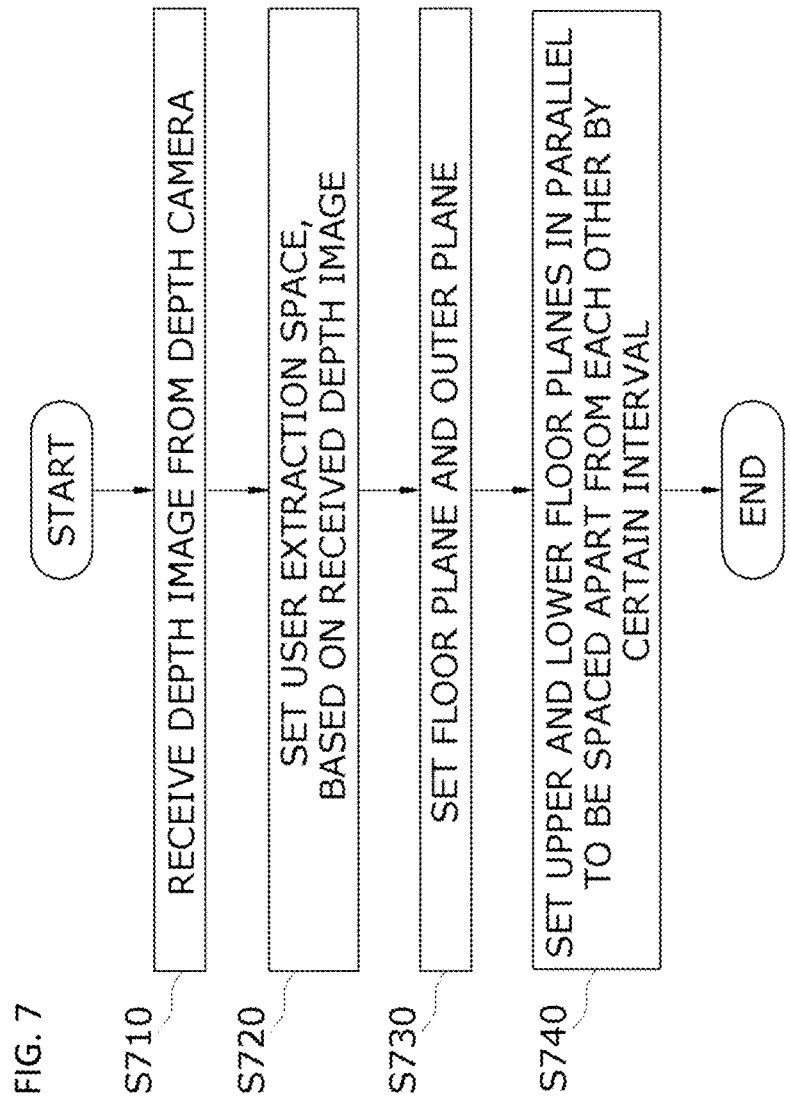
FIG. 7 is a flowchart illustrating an operation of setting a floor plane, an outer plane, an upper floor plane, and a lower floor plane according to an embodiment of the present invention.

FIG. 7 is a flowchart illustrating an operation of setting a floor plane, an outer plane, an upper floor plane, and a lower floor plane according to an embodiment of the present invention.

The object detection method according to an embodiment of the present invention, as described above, may previously set an object extraction space. Therefore, a depth image may be received from a depth camera in step S710.

Subsequently, in step S720, an object extraction space may be set based on the received depth space. Subsequently, four points contacting a floor plane may be detected from the object extraction space, and the floor plane may be set. Also, a plane, passing through two successive points among the four points included in the floor plane, among planes vertical to the floor plane, may be set as an outer plane in step S730.

Subsequently, in step S740, the object detection method may set an upper floor plane and a lower floor plane which are set above and under the floor plane in parallel to be spaced apart from each other by a predetermined interval.

Figure 8:
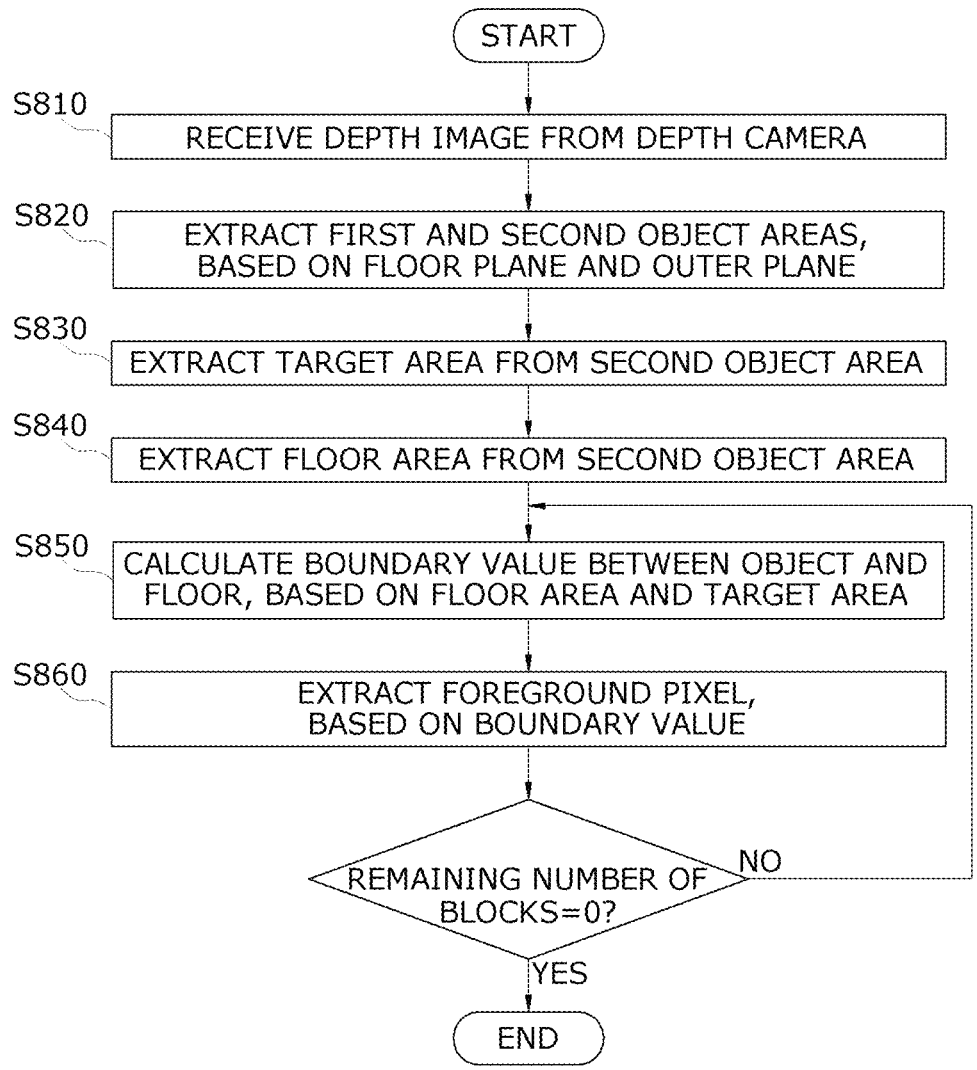
FIG. 8 is a flowchart of an object detection method according to an embodiment of the present invention.

FIG. 8 is a flowchart of an object detection method according to an embodiment of the present invention.

First, in the object detection method according to an embodiment of the present invention, a depth image may be received from a depth camera in step S810.

Subsequently, the object detection method may extract a first object area and a second object area from the received depth image, based on a predetermined floor plane and an outer plane which is set with respect to the floor plane. In this case, the second object area may include an object and a floor and may be disposed under the first object area.

The floor plane may include an upper floor plane and a lower floor plane which are set above and under the floor plane in parallel to be spaced apart from each other by a predetermined interval. Therefore, the first object area may be extracted based on the upper floor plane and the outer plane. Also, the second object area may be extracted based on the outer plane, the upper floor plane, and the lower floor plane. That is, the first object area may correspond to an area above the upper floor plane, and the second object area may correspond to an area under the upper floor plane.

Subsequently, in step S830, the object detection method may extract a target area including pixels of the second object area which are spaced apart from the first object area by a predetermined interval. In this case, the target area may be segmented into a plurality of block areas smaller than the target area.

Subsequently, in step S840, the object detection method may sample pixels which are not included in the target area, thereby extracting the floor area from the second object area. The floor area may be extracted from the second object area by sampling pixels which are included in the second object area and are not included in the target area with respect to one of the segmented block areas.

In this case, the extracted floor area may be expressed in a plane equation form. That is, points of an extracted floor plane may each be expressed in a 3D vector form, and thus may be derived as an equation-form plane for minimizing a squared error.

Subsequently, in step S850, the object detection method may calculate a boundary value of the object and the floor, based on the extracted floor area and target area. In step S860, the object detection method may extract a foreground pixel from the target area, based on the calculated boundary value. In this case, distances between the plane extracted from the floor area and pixels included in each of the block areas may be calculated, and the boundary value may be calculated based on a distribution of the calculated distances. As described above, the foreground pixel may be extracted from the block areas, based on the boundary value.

That is, referring to FIG. 6, the object detection method may maintain pixels, having the same direction as that of the first object area, among pixels included in each of the block areas. The object detection method may remove pixels, having a direction opposite to that of the first object area, from among pixels included in each of the block areas, and then may calculate distances between the plane derived from the floor area and the pixels having the same direction as that of the first object area A1. The object detection method may select points where the calculated distances have a certain value or more, thereby finally extracting a foreground pixel.

An operation of extracting the floor area, an operation of calculating the boundary value, and an operation of extracting the foreground pixel may be performed for each of the block areas. That is, since the operations are performed for each block area, the object may be finally detected from the depth image.

According to an embodiment of the present invention, an object is easily separated from a depth image, and particularly, when the object contacts a floor, a floor plane and the object are more clearly separated and detected.

Furthermore, a method using visible light may detect an object only when there is a color difference between a background and an object, and has a problem where the number of operations increases for solving a problem such as a shadow being formed. However, according to an embodiment of the present invention, only an object area is accurately extracted from a depth image without any limitation in color of the object or color of a floor background.

In the above description, steps S810 to S860 may be further divided into additional steps or may be combined into fewer steps. Also, some steps may be omitted depending on the case, and the order of steps may be changed. Furthermore, despite other omitted details, the details of the object detection system described above with reference to FIGS. 2 to 6 may be applied to the object detection method illustrated in FIG. 8.

FIGS. 9A to 9D are diagrams illustrating an example of an operation result of an object detection system and method according to an embodiment of the present invention.

Figure 9A:
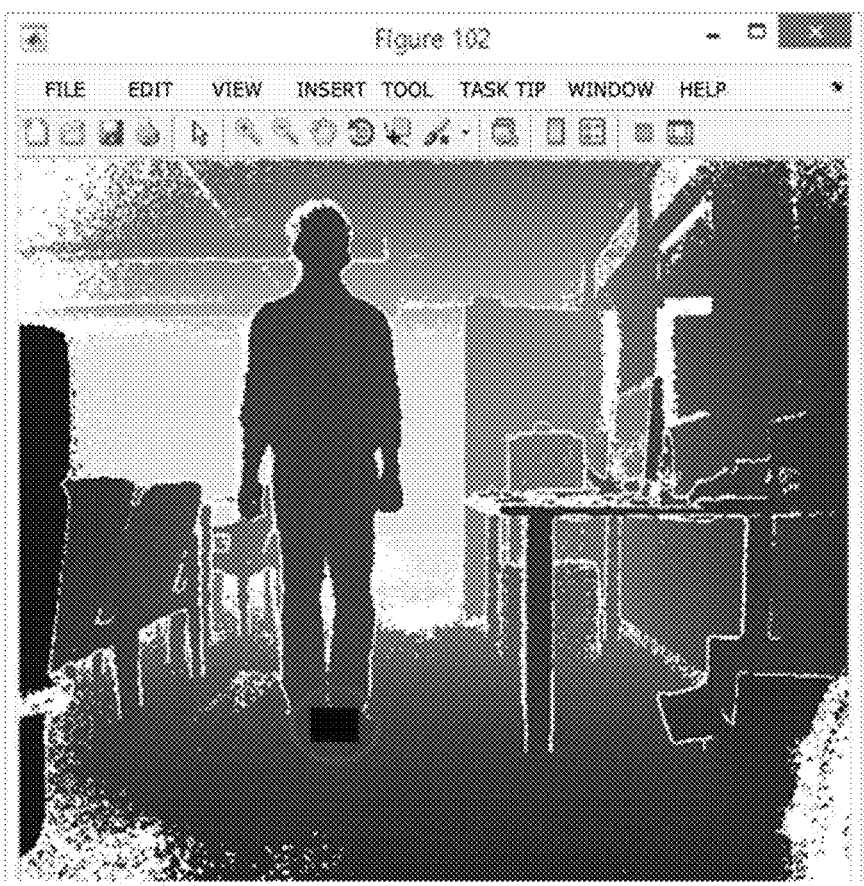
FIGS. 9A to 9D are diagrams illustrating an example of an operation result of an object detection system and method according to an embodiment of the present invention.
Figure 9B:
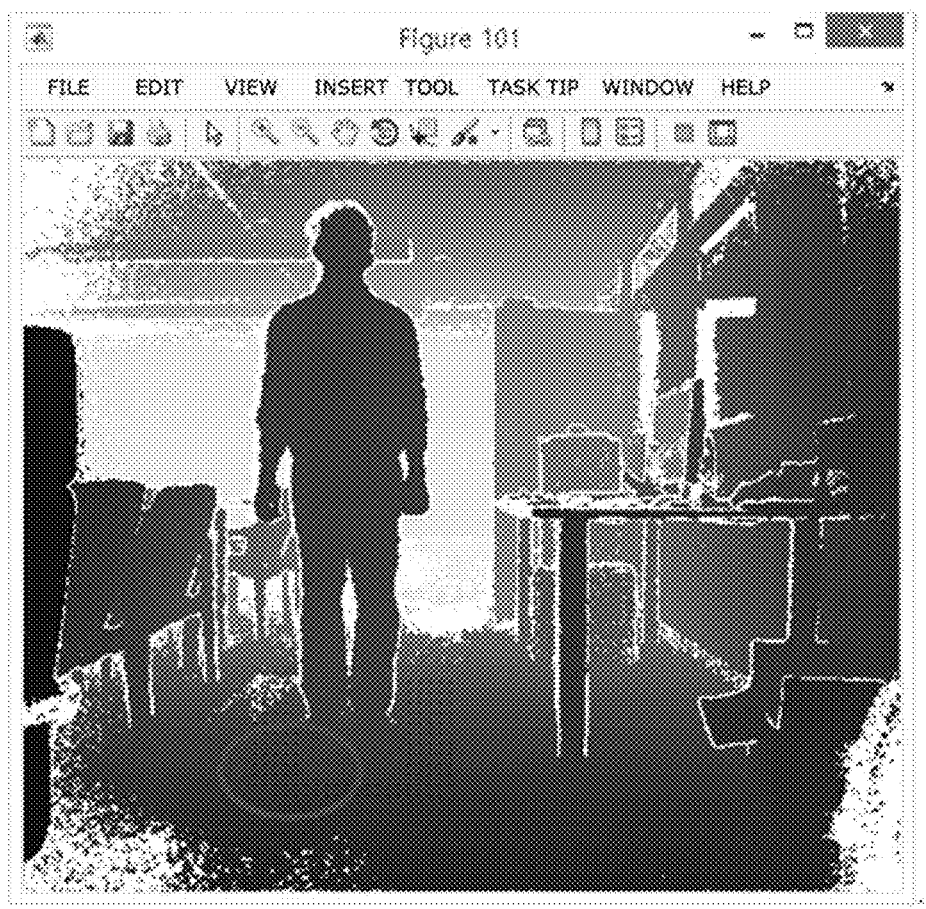
Figure 9C:
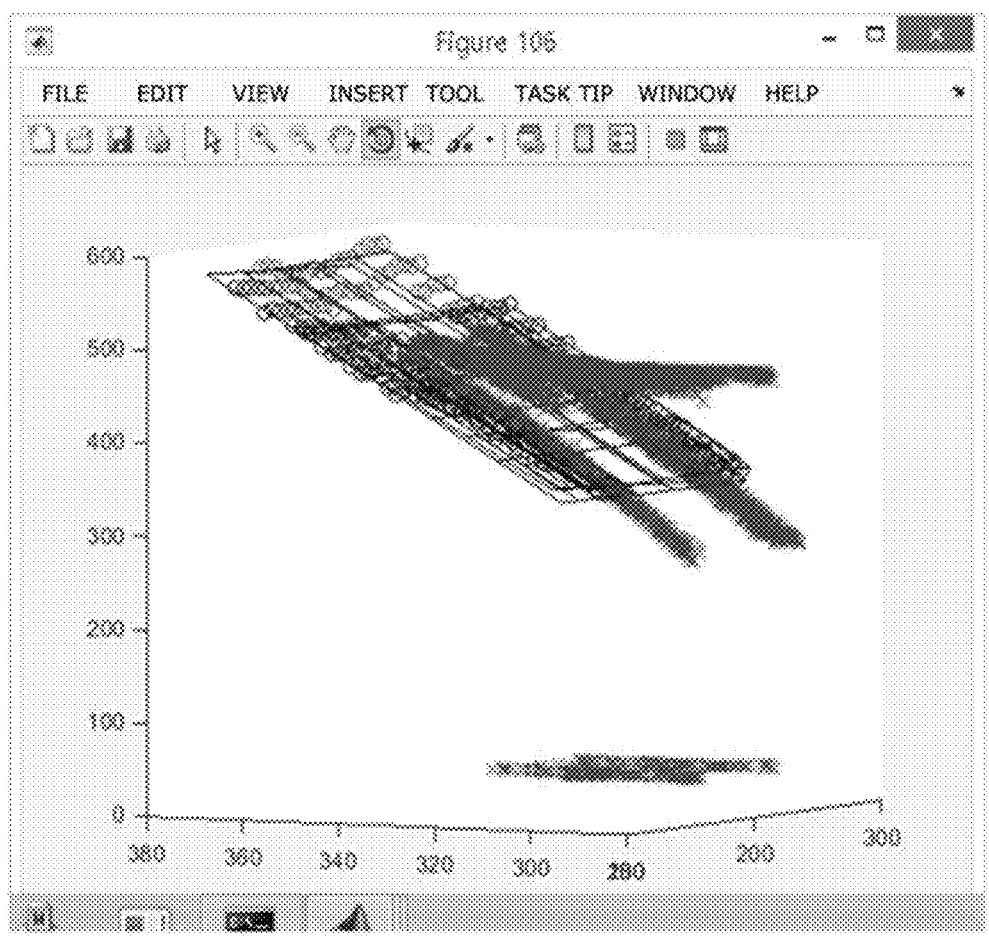
Figure 9D:
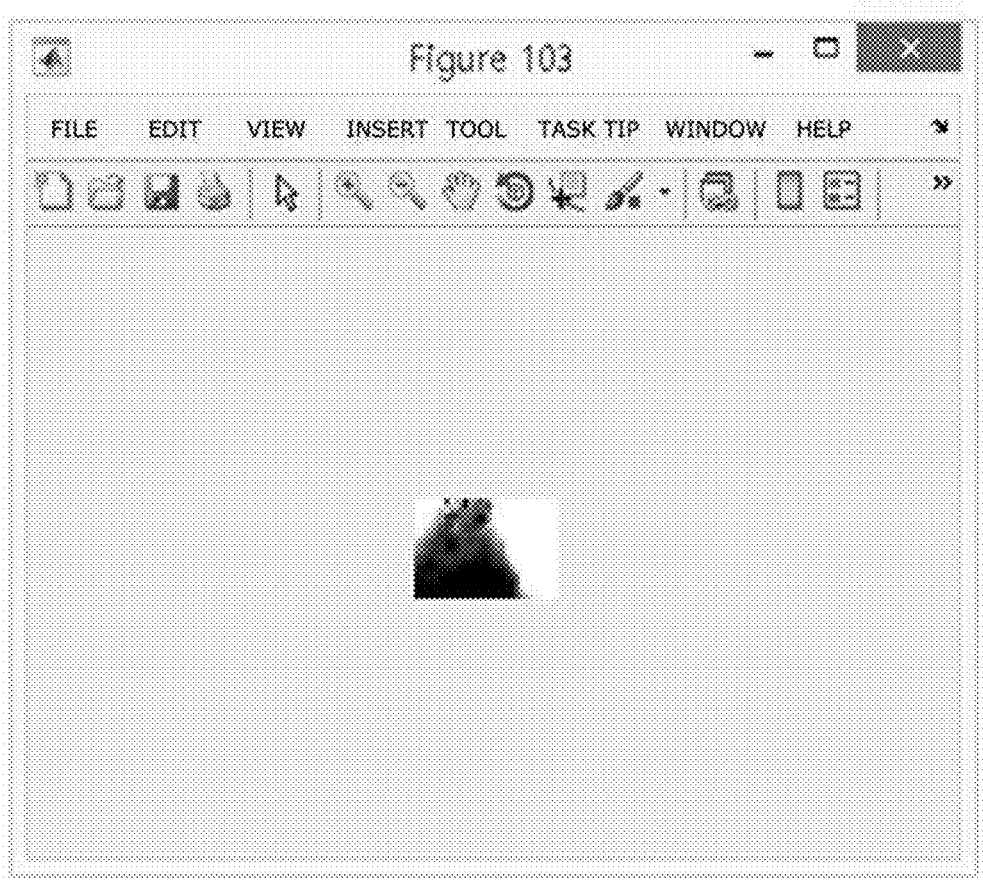

FIG. 9A is a diagram illustrating an example where a target area is segmented into a plurality of block areas. A target area may be segmented into a plurality of block areas smaller than the target area, and a boundary value may be derived from each of the segmented block areas, thereby extracting a foreground pixel. FIG. 9B illustrates a result which is obtained by sampling only points, which are included in a second object area but are not included in the target area, in each of the block areas. FIG. 9C illustrates a result which is obtained by extracting a floor area, based on the sampled points. FIG. 9D illustrates a result which is obtained by finally separating a human body and a background from each of the block areas illustrated in FIG. 9A.

The object detection method performed by the object detection system 100 according to the embodiments of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and system according to the embodiments of the present invention have been described in association with a specific embodiment, but their elements, some operations, or all operations may be implemented by using a computer system having general-use hardware architecture.

As described above, according to the embodiments of the present invention, an object is easily separated from a depth image captured by a depth camera.

Particularly, if an object contacts a floor, a floor plane and the object are more accurately separated from each other and detected.

Moreover, only an object area is accurately extracted from a depth image without any limitation in color of the object or color of a floor background.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for detecting an object from a depth image, the system comprising:
a communication module;
a memory configured to store an object detection program; and
a processor configured to execute the object detection program,
wherein
by executing the object detection program, the processor extracts a first object area and a second object area from the depth image, based on a floor plane and an outer plane which is set with respect to the floor plane,
the processor extracts a target area including pixels of the second object area which are spaced apart from the first object area by a predetermined interval,
the processor samples a pixel, which is included in the second object area but is not included in the target area, to extract a floor area from the second object area, calculates distances between the plane extracted from the floor area and pixels having a same direction as a direction of the first object area, calculates a boundary value between the object and a floor based on the calculated distances, and extracts a foreground pixel from the target area, based on the calculated boundary value, and
the second object area comprises the object and the floor and is disposed under the first object area.

2. The system of claim 1, wherein
the floor plane comprises an upper floor plane and a lower floor plane which are set above and under the floor plane, respectively, in parallel and spaced apart from each other by a predetermined interval, and
the processor extracts the first object area, based on the upper floor plane and the outer plane.

3. The system of claim 2, wherein the processor extracts the second object area, based on the outer plane, the upper floor plane, and the lower floor plane.

4. The system of claim 1, wherein
the processor segments the target area into a plurality of block areas, and
the processor samples a pixel, which is included in the second object area but is not included in the target area, with respect to one of the segmented block areas to extract a floor area from the second object area.

5. The system of claim 4, wherein the processor removes pixels, corresponding to a direction opposite to the direction of the first object area, from among pixels included in each of the block areas, and calculates the boundary value between the object and the floor based on a distribution of the calculated distances.

6. The system of claim 5, wherein the foreground pixel is extracted from among pixels having the calculated boundary value or more in the plurality of block areas.

7. The system of claim 1, wherein the communication module receives the depth image in units of one frame from the depth camera.

8. The system of claim 1, wherein
the floor plane is set with respect to four pixels, and
the outer plane is set as a plane contacting two pixels, which are successively disposed, among the four pixels in planes vertical to the floor plane.

9. An object detection method performed by an object detection system, the object detection method comprising:
receiving a depth image from a depth camera;
extracting a first object area from the depth image, based on a predetermined floor plane and an outer plane which is set with respect to the predetermined floor plane;

extracting a second object area from the depth image, based on the predetermined floor plane and the outer plane;

extracting a target area including pixels of the second object area which are spaced apart from the first object area by a predetermined interval;

sampling a pixel, which is included in the second object area but is not included in the target area, to extract a floor area from the second object area;

calculating distances between a plane extracted from the floor area and pixels having a same direction as a direction of the first object area;

calculating a boundary value between the object and a floor based on the calculated distances; and extracting a foreground pixel from the target area, based on the calculated boundary value, wherein the second object area comprises the object and the floor and is disposed under the first object area.

10. The object detection method of claim 9, wherein the floor plane comprises an upper floor plane and a lower floor plane which are set above and under the floor plane, respectively, in parallel and spaced apart from each other by a predetermined interval, the extracting of the first object area comprises extracting the first object area, based on the upper floor plane and the outer plane, and the extracting of the second object area comprises extracting the second object area, based on the outer plane, the upper floor plane, and the lower floor plane.

11. The object detection method of claim 9, wherein the extracting of the floor area comprises:

segmenting the target area into a plurality of block areas; and sampling a pixel, which is included in the second object area but is not included in the target area, with respect to one of the segmented block areas to extract a floor area from the second object area.

12. The object detection method of claim 11, wherein the calculating of the boundary value comprises:

removing pixels, corresponding to a direction opposite to a direction of the first object area, from among pixels included in each of the block areas;

extracting the plane corresponding to the floor area;

calculating the boundary value between the object and the floor, based on a distribution of the calculated distances, and the extracting of the foreground comprises extracting the foreground pixel from among pixels having the calculated boundary value or more in the plurality of block areas.

13. The object detection method of claim 11, wherein the extracting of the floor area, the calculating of the boundary value, and the extracting of the foreground pixel are performed for each of the block areas.

* * * * *